Figure 1:
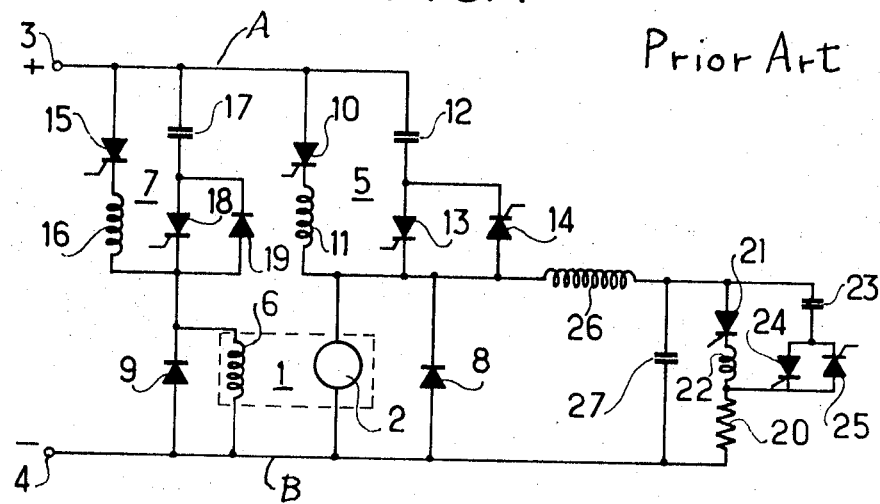

United States Patent
Vidal et al.

[15] 3,651,390
[45] Mar. 21, 1972

[54] METHOD AND ARRANGEMENT FOR QUENCHING A BRAKING THYRATRON FOR MOTORS

[72] Inventors: Gilbert Vidal, Draveil; Bernard Peron, Villetaneuse, both of France

[73] Assignee: Societe Generale de Constructions Electriques et Mechaniques (Alsthom), Paris, France

[22] Filed: Apr. 14, 1970

[21] Appl. No.: 28,319

[30] Foreign Application Priority Data

Apr. 14, 1970 France..................................6911898

[52] U.S. Cl. ............................................318/269, 318/379
[51] Int. Cl. .......................................................H02p 3/12
[58] Field of Search ........................318/258, 269, 379, 380; 321/45 C

[56] References Cited

UNITED STATES PATENTS

| | | | |
|---|---|---|---|
| 3,222,587 | 12/1965 | Lichowsky | 318/380 |
| 3,325,714 | 6/1967 | Torii | 318/269 |
| 3,344,324 | 9/1967 | Morris | 318/258 |
| 3,447,054 | 5/1969 | Hansen et al. | 318/269 |

Primary Examiner—Bernard A. Gilheany
Assistant Examiner—W. E. Duncanson, Jr.
Attorney—Arthur O. Klein

[57] ABSTRACT

A supply and control circuit for a DC motor having a separately excited field coil and armature, and a method of operating such circuit. The field coil and armature are supplied with current interrupters. Connected in parallel with the separately excited field coil of the motor there is a first thyristor which plays a "free wheeling" role. A second circuit connected in parallel with the field coil includes an inductance, a second thyristor, and a zener diode connected in series. A condenser is connected in parallel with the zener diode. A diode is connected in parallel with the inductance and first thyristor. The parts are so arranged that the firing of the principal thyristor of the current interrupter for the field coil of the motor, after the operation of braking the motor, produces the extinction of the second thyristor, thereby bringing the current flow in the field coil to zero. When the current flow has been restored to its positive value and attains a predetermined potential, the principal thyristor in the interrupter which supplies the armature of the motor with current may be fired to restore the functioning of the motor as a driving motor.

5 Claims, 2 Drawing Figures

3,651,390

INVENTORS:
GILBERT VIDAL
BERNARD PERON

BY: Arthur O. Klein
ATTORNEY

METHOD AND ARRANGEMENT FOR QUENCHING A BRAKING THYRATRON FOR MOTORS

This invention relates to a variable braking system for a DC driving motor having a separate source of excitation. More precisely, the motor with which the invention is concerned is fed by the intermediary of current interrupters in both the circuits which supply the armature and the field winding, respectively. During braking, the motor functions as a generator of a reverse potential, designated the braking potential, through the intermediary of a thyristor, designated a braking thyristor.

Each of the current interrupters comprises a principal thyristor, a thyristor for quenching the principal thyristor, an inductance and a switching condenser, and a thyristor or rectifier for charging such condenser.

The invention is particularly adapted for application to road vehicles having electrical motors separately excited and fed by storage batteries or consumable batteries, and railroad vehicles driven by electric motors having separate excitation.

The braking thyristor, which is connected in series with the braking potential, must be able to be extinguished at least at the end of the braking period; this has required, in previously known systems, the use of an extinction thyristor, a switching inductance and a switching condenser, and a thyristor for recharging the switching condenser, as well as a choke coil and a decoupling condenser. This has rendered the system quite bulky and costly.

The present invention makes it possible to eliminate the circuit elements previously connected to the braking thyristor; to accomplish such result, at the end of the braking period there is a brief reversal of the direction of the current for exciting the driving motor; this causes an inversion in the polarity of the current applied to the terminals of the motor, and as a result, produces extinction of the braking thyristor.

Such momentary inversion of the exciting current for the motor can be produced in a known circuit, for example, wherein the field coil of the motor is fed through the intermediary of a thyristor bridge.

The system according to the invention provides a particularly simple arrangement for effecting such inversion of the current which feeds the field of the motor. In accordance with the invention, there is connected in parallel with the field of the motor a first thyristor which is able to play a "free wheeling" role, and on the other hand, there is employed a condenser which is mounted in parallel with a voltage limiter such as a zener diode. Connected between the current interrupter which feeds the field of the motor and the parallel connected voltage limiter and condenser are two branch lines, the first of which includes a second thyristor connected in series with an inductance, and the second of which includes a diode, the direction of connection of the second thyristor being such that it is connected by its anode and its cathode to the cathode and the anode, respectively, of the first thyristor. The inductance in series with the second thyristor is strongly coupled with the switching inductance of the current interrupter for supplying the field of the motor; the parts are so connected that when the principal thyristor of such current interrupter fires, the second thyristor is extinguished.

With the aid of the accompanying drawings, there is described a preferred embodiment of the system of the present invention.

Figure 2:
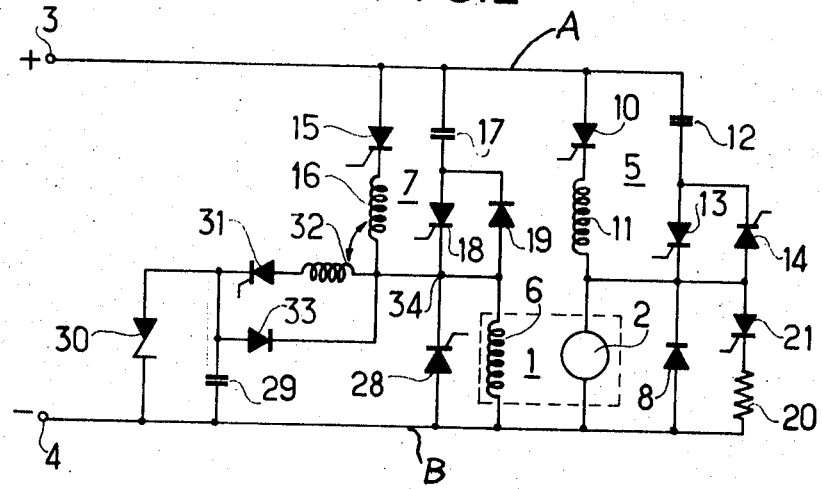

In such drawings:

FIG. 1 is a circuit diagram of a prior art system for braking a separately excited direct current motor; and FIG. 2 shows a circuit diagram of a system in accordance with the present invention.

In the prior art system shown in FIG. 1, the DC motor 1 has its armature 2 fed by a source of direct current (not shown) which is connected to plus and minus terminals 3 and 4 of main wires A and B, respectively, through the intermediary of a current interrupter 5. The field coil 6 of the motor 1 is fed through the intermediary of a current interrupter 7. Connected across the terminals of the armature 2 is a "free wheeling" diode 8, and connected across the terminals of the field coil 6 of the motor is a "free wheeling" diode 9.

The current interrupter 5 consists of a principal thyristor 10, a switching inductance 11, a switching condenser 12, a thyristor 13 for extinguishing the principal thyristor 10, and a thyristor 14 for recharging the condenser 12. Likewise, the current interrupter 7 consists of a principal thyristor 15, a switching inductance 16, a switching condenser 17, a thyristor 18 for extinguishing the principal thyristor 15, and a rectifier 19 for charging the condenser 17. The junction between inductance 16 and field coil 6 is designated 34.

When the motor 1 is being braked, the motor functions as a generator of a reverse braking potential, such oppositely directed potential being imposed upon a resistor 20 by means of a braking thyristor 21. The circuit of the thyristor 21 includes a switching inductance 22, a switching condenser 23, an extinguishing thyristor 24, and a thyristor 25 for charging the condenser 23, the thyristors 24 and 25 being reversely connected in parallel, as shown. It is also necessary to employ a choke coil 26 and a condenser 27.

In the circuit of the invention shown in FIG. 2 the same elements are found as those in FIG. 1 with the exception that there have been omitted from the circuit of the extinction thyristor 21 the following elements: the inductance 22, the condenser 23, thyristors 24 and 25, as well as the choke coil 26 and the condenser 27. The following elements have been added to the circuit of FIG. 1: a thyristor 28 is connected between junction 34 and wire B. A first line 35, extending from the junction 34 to the wire B, has the following elements connected in series: an inductance 32, the anode of a thyristor 31, the cathode of such a thyristor, the anode of a zener diode 30, and the cathode of such zener diode. A second line 36, which extends from line 35 in advance of the zener diode 30 to the wire B, has a condenser 29 interposed therein. A third line 37 extends from junction 34 to the cathode of a diode 33, the anode of such diode being connected to the line 36 in advance of the condenser 29. As indicated by the curved arrow in FIG. 2, the inductances 16 and 32 are closely magnetically coupled to each other.

The illustrative circuit (FIG. 2) of the invention operates as follows: When the motor 1 is being driven, the current interrupters 5 and 7 regulate the amount of current fed to the armature 2 and the field coil 6, respectively, by firing or rendering conductive the thyristors 10 and 15 for a predetermined time so as to feed the armature 2 and field 6 from the current source 3, 4. When it is desired to brake the motor 1, the thyristor 10 is not refired, and the braking thyristor 21 is fired, the current interrupter 7 continuing to function. During the driving of the motor 1, and also during its functioning while being braked, the thyristor 28 is fired at the same time that the thyristor 15 is extinguished and the thyristor 18 is fired, so that the thyristor 28 plays the role of a "free wheeling" diode. The thyristor 28 is extinguished when the thyristor 15 is refired.

At the end of the braking period, it is necessary, in accordance with the invention, momentarily to reverse the direction of current passing through the field coil 6. To accomplish this, the thyristor 15 is not fired any longer, nor is the thyristor 28 fired. The current circulating in the field coil 6 charges the condenser 29 through the diode 33 up to the potential which is determined by the voltage limiting device, that is, the zener diode 30. The thyristor 31 is then fired; this permits the condenser 29 to discharge by passing through field coil 6 a current in the opposite direction from that, which we shall call positive, which passes through it during both its being driven and being braked. There thus results an inversion of the polarity of the voltage generated by the motor 1 and thus an inversion of the polarity at the terminals of the thyristor 21, thereby producing an extinction of such thyristor.

When motor 1 is again to be driven, the thyristor 15 is fired; this, by the coupling effect between the coils 16 and 32 causes extinction of the thyristor 31. The current in the field coil 6 is thereby annulled. When the current in the field coil 6 regains its positive value and attains a predetermined potential, the thyristor 10 may be fired in order to restore the functioning of the motor 1 as a driving motor by supplying current to armature 2 through interrupter 5.

Although the invention is illustrated and described with reference to one preferred embodiment thereof, it is to be understood that it is in no way limited to the disclosure of such a preferred embodiment, but is capable of numerous modifications within the scope of the appended claims.

What is claimed is:

1. In a method of operating a DC motor wherein the motor is driven by separately exciting its field coil and armature with a first polarity via intermittent pulses and wherein the motor is dynamically braked by terminating the armature excitation and simultaneously coupling a load across the armature terminals by operating a suitably disposed thyristor gate forward-biased when the armature voltage has the first polarity, an improved technique for terminating such dynamic braking, which comprises:

reversing the polarity of excitation of the field coil to reverse the armature voltage polarity, thereby removing the forward bias on the thyristor gate to decouple the load from the armature.

2. A method as defined in claim 1, in which the reversal of polarity is accomplished by:

terminating the excitation of the field coil while the armature is coupled to the load;

externally storing the energy represented by the current flowing through the field coil when its excitation is terminated; and passing a current derived from such stored energy through the field coil in a direction opposite to the direction of current therethrough when its excitation is terminated.

3. A method as defined in claim 2, further comprising the simultaneous steps of terminating the derived current and re-exciting the field coil with the first polarity.

4. In combination with a DC motor having a field coil and an armature:

first normally unoperated, unidirectional switching means operable to excite the field coil with a first polarity;

second normally unoperated, unidirectional switching means operable to excite the armature with the first polarity;

a normally unoperated thyristor gate having a transconductive path interconnecting the armature with a load, the thyristor gate being poled to pass current from the armature to the load when the armature is excited with the first polarity;

a capacitor;

a charging path including a diode serially interconnecting the field coil and the capacitor, the diode being poled to be forward-biased when the field coil is excited with the first polarity; and a discharge path including third normally unoperated, unidirectional switching means serially interconnecting the field coil and the capacitor, the third switching means being poled to pass current through the field coil in a direction opposite to that passed when the field coil is excited with the first polarity.

5. The combination as defined in claim 4, further comprising means for disabling the third switching means upon operation of the first switching means.

* * * * *